US008024588B2

(12) United States Patent
Cheng et al.

(10) Patent No.: US 8,024,588 B2
(45) Date of Patent: Sep. 20, 2011

(54) ELECTRONIC APPARATUS HAVING SIGNAL PROCESSING CIRCUIT SELECTIVELY ENTERING POWER SAVING MODE ACCORDING TO OPERATION STATUS OF RECEIVER LOGIC AND RELATED METHOD THEREOF

(75) Inventors: Ann-Tzung Cheng, Taipei County (TW); Hsien-Chyi Chiou, Hsinchu (TW); Chih-Ju Tai, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 652 days.

(21) Appl. No.: 11/946,049

(22) Filed: Nov. 28, 2007

(65) Prior Publication Data
US 2009/0138735 A1 May 28, 2009

(51) Int. Cl.
G06F 1/26 (2006.01)
G06F 1/32 (2006.01)
(52) U.S. Cl. .................. 713/320; 713/300; 342/357.74; 701/213
(58) Field of Classification Search .......... 713/300, 713/320; 342/357; 701/213
See application file for complete search history.

(56) References Cited

U.S. PATENT DOCUMENTS

| 5,592,173 | A | 1/1997 | Lau | |
|---|---|---|---|---|
| 6,662,107 | B2 | 12/2003 | Gronemeyer | |
| 7,071,871 | B2 | 7/2006 | Horslund | |
| 2001/0019316 | A1 | 9/2001 | Hasegawa | |
| 2005/0280576 | A1* | 12/2005 | Shemesh et al. | 342/357.1 |
| 2006/0195260 | A1* | 8/2006 | Gronemeyer | 701/213 |

FOREIGN PATENT DOCUMENTS

| CN | 1311568 A | 9/2001 |
|---|---|---|
| TW | 200712527 | 4/2007 |

* cited by examiner

Primary Examiner — Thomas Lee
Assistant Examiner — Michael J Brown
(74) Attorney, Agent, or Firm — Winston Hsu; Scott Margo

(57) ABSTRACT

An electronic apparatus with power saving functionality is disclosed. The electronic apparatus has a first signal processing circuit and a second signal processing circuit. The first signal processing circuit includes a receiver logic for processing at least a satellite signal generated from a global navigation satellite system (GNSS) to obtain resultant data; and a power saving determination logic for monitoring an operation status of the receiver logic and generating a first control signal according to the operation status. The second signal processing circuit includes a processing logic for receiving the resultant data from the receiver logic for further signal processing; and a power saving trigger logic for controlling the processing logic to enter a power saving mode from a normal mode when receiving the first control signal from the power saving control logic.

20 Claims, 7 Drawing Sheets

ELECTRONIC APPARATUS HAVING SIGNAL PROCESSING CIRCUIT SELECTIVELY ENTERING POWER SAVING MODE ACCORDING TO OPERATION STATUS OF RECEIVER LOGIC AND RELATED METHOD THEREOF

BACKGROUND

The present invention relates to reducing power consumption of an electronic apparatus, and more particularly, to an electronic apparatus having a signal processing circuit selectively entering a power saving mode according to operation status of a receiver logic implemented for processing satellite signals from a global navigation satellite system and related method thereof.

GPS receivers are widely used in a variety of fields. For example, a navigation device has a GPS receiver included therein for providing needed positioning information to perform the navigation function. In general, the conventional navigation device has two processors, one implemented in the GPS receiver for baseband signal processing, and the other implemented in a navigation host to process positioning information provided from the GPS receiver for navigation purpose. After the integrated navigation device is powered on, the baseband processor in the GPS receiver and the navigation processor in the navigation host are both running in full power for performing respective intended functions. It is possible that the GPS receiver is unable to generate the required positioning information during a period of time. For example, the GPS receiver requires a period of time to search for satellites available on the sky and then fix the location according to satellite signals generated from the tracked satellites after a cold start. In other words, the GPS receiver can't obtain the required positioning information immediately after the cold start. Additionally, when the signal quality of the received satellite signals is low or there are insufficient satellites in sight, the GPS receiver is unable to obtain the positioning information successfully. Under these circumstances, the navigation processor however still runs in full power and consumes much power even though the positioning information is temporarily unavailable. Additionally, in certain applications, the navigation function is not active all the time. However, the conventional GPS receiver, integrated into the navigation device, outputs the computed position information to the navigation host continuously, if the position information can be obtained successfully. As a result, the overall power consumption is inevitably increased due to redundant data transmission of the position information between the GPS receiver and the navigation host.

SUMMARY

It is therefore one of the objectives of the present invention to provide an electronic apparatus having a signal processing circuit selectively entering a power saving mode according to operation status of a receiver logic implemented for processing satellite signals from a global navigation satellite system and related method thereof.

According to one embodiment of the present invention, an electronic apparatus with power saving functionality is provided. The electronic apparatus includes first signal processing circuit and a second signal processing circuit. The first signal processing circuit comprises: a first signal processing circuit comprising a receiver logic for processing at least a satellite signal generated from a global navigation satellite system (GNSS) to obtain resultant data, and a power saving determination logic for monitoring an operation status of the receiver logic and generating a first control signal according to the operation status. The second signal processing circuit is coupled to the first signal processing circuit, and comprises: a processing logic, for receiving the resultant data from the receiver logic for further signal processing; and a power saving trigger logic, coupled to the processing logic, for controlling the processing logic to enter a power saving mode from a normal mode when receiving the first control signal from the power saving control logic. The processing logic operating in the power saving mode has less power consumption than the processing logic operating in the normal mode.

According to another embodiment of the present invention, an electronic apparatus is provided. The electronic apparatus comprises: a receiver logic, for processing at least a satellite signal generated from a global navigation satellite system (GNSS) to obtain resultant data; and a processing logic, for receiving the resultant data from the receiver logic for further signal processing, wherein the receiver logic transmits the data to the processing logic only when receiving a request command generated from the processing logic.

According to yet another embodiment of the present invention, a signal processing method is provided. The method comprises: processing at least a satellite signal generated from a global navigation satellite system (GNSS) to obtain resultant data; monitoring an operation status of step (a), and generating a first control signal according to the operation status; utilizing a processing logic to receive the resultant data for further signal processing; and controlling the processing logic to enter a power saving mode from a normal mode when receiving the first control signal. The processing logic operating in the power saving mode has less power consumption than the processing logic operating in the normal mode.

According to further another embodiment of the present invention, a signal processing method is provided. The signal processing method comprises: processing at least a satellite signal generated from a global navigation satellite system (GNSS) to obtain resultant data; and receiving the resultant data for further signal processing only after generating a request command for the resultant data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
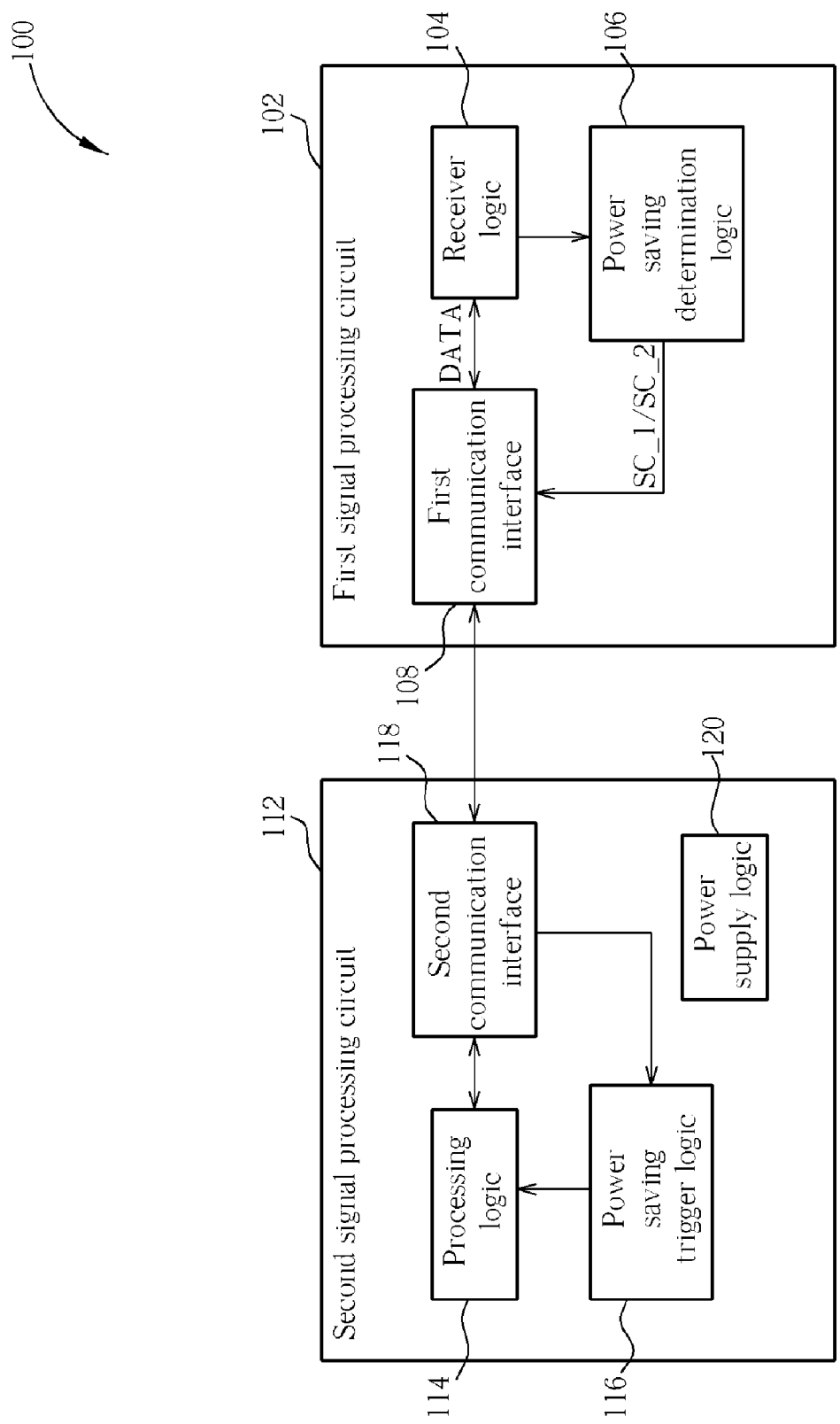
FIG. 1 is a block diagram illustrating an electronic apparatus with power saving functionality according to a first embodiment of the present invention.

FIG. 1 is a block diagram illustrating an electronic apparatus 100 with power saving functionality according to a first embodiment of the present invention. In this embodiment, the electronic apparatus 100 is a portable navigation device (PND) having a global navigation satellite system (GNSS) receiver integrated therein. However, it should be noted that the power saving mechanism disclosed below can be applied to any application having a GNSS receiver and a navigation system integrated therein. As shown in FIG. 1, the electronic apparatus 100 includes a first signal processing circuit 102 and a second signal processing circuit 112. The first signal processing circuit 102 includes a receiver logic 104, a power saving determination logic 106, and a first communication interface 108; and the second signal processing circuit 112 includes a processing logic 114, a power saving trigger logic 116, a second communication interface 118, and a power supply logic 120. It should be noted only the components pertinent to the present invention are shown in FIG. 1 for simplicity. The second signal processing circuit 112 acts as a navigation host in the navigation device (i.e., the electronic apparatus 100), and the first signal processing circuit 102 acts as a global navigation satellite system (GNSS) receiver integrated in the navigation device (i.e., the electronic apparatus 100).

In this embodiment, the receiver logic 104 is configured to search for satellites in a global navigation satellite system (e.g., GPS, Galileo, or GLONASS), receives satellite signals from the tracked satellites, and then computes position information according to the satellite signals. For instance, the receiver logic 104 is implemented using a conventional GPS receiver, and includes any components required for achieving the intended function. The resultant data DATA generated from processing a plurality of satellite signals of tracked satellites contain the positioning information required by the navigation host. The first communication interface 108 therefore is used for communicating with the second communication interface 118 to deliver the computed position information from the receiver logic 104 to the processing logic 114 for further signal processing. The first and second communication interfaces 108 and 118 can be implemented using Bluetooth interfaces, universal asynchronous receiver/transmitter (UART) interfaces, or any available connection means. The processing logic 114 is implemented for performing navigation function. In this embodiment, each of the receiver logic 104 and the processing logic 114 has a microprocessor. The microprocessor in the processing logic 114 is for navigation processing, while the microprocessor in the receiver logic 104 is for baseband signal processing.

To achieve the objective of reducing power consumption of the processing logic, the power saving trigger logic 116 and the power saving determination logic 106 are added to the second signal processing circuit 112 and the first signal processing circuit 102 respectively. As shown in FIG. 1, the power saving determination logic 106 is coupled to the receiver logic 104, and is configured for monitoring an operation status of the receiver logic 104 and selectively generating a first control signal SC_1 or a second control signal SC_2 according to the monitored operation status. The first control signal SC_1 is to enable the power saving functionality of the processing logic 114, while the second control signal SC_2 is to disable the power saving functionality of the processing logic 114. That is, the power saving trigger logic 116, which is coupled to the processing logic 114, generates a control signal to instruct the processing logic 114 to enter a power saving mode from a normal mode when receiving the first control signal SC_1 from the power saving control logic 106 through the first and second communication interfaces 108, 118; and generates another control signal (e.g., an interrupt) to instruct the processing logic 114 to enter the normal mode from the power saving mode when receiving the second control signal SC_2 from the power saving control logic 106 through the first and second communication interfaces 108 and 118.

In the present invention, the monitored operation status mentioned above is, for example, a signal processing status of the received satellite signals. Therefore, the power saving determination logic 106 generates the first control signal SC_1 when detecting that the receiver logic 104 fails to fix the location due to losing contact with satellites, poor signal quality of satellite signals received by the receiver logic 104, and/or weak strength of the satellite signals received by the receiver logic 104; or detecting that the positioning accuracy is not good enough. On the contrary, when detecting that the positioning accuracy is good enough or the location is successfully fixed (i.e., the positioning information can be obtained successfully), the power saving determination logic 106 generates the second control signal SC_2 accordingly. Please note that above signal trigger conditions are for illustrative purposes only. Based on design requirements, using other signal trigger conditions associated with operation of the receiver logic is possible and still falls in the scope of the present invention.

The processing logic 114 operating in the power saving mode has less power consumption than the processing logic 114 operating in the normal mode, thereby achieving the objective of reducing power consumption of the navigation host (i.e., the second signal processing circuit 112). In one exemplary embodiment, the power supply logic 120 cuts off the power supply of the processing logic 114 when the processing logic 114 enters the power saving mode. However, it should be noted that switching the processing logic 114 into the power saving mode is not limited to completely power down the processing logic 114. Any techniques capable of reducing the power consumption of the processing logic 114 can be applied when the processing logic 114 is controlled to enter the power saving mode. For example, the same objective of reducing power consumption of the processing logic 114 is achieved by reducing clock rate of the navigation processor (e.g., a general-purpose microprocessor) included in the processing logic 114. This alternative design also obeys the spirit of the present invention. Additionally, the power supply logic 120 does not completely cut off the power supply of the power saving trigger logic 116 and the second communication interface 118 when the processing logic 114 stays in the power saving mode, which allows the second communication interface 118 to receive the second control signal SC_2 and allows the power saving trigger logic 116 to instruct the processing logic 114 to leave the power saving mode when notified by the second control signal SC_2.

Figure 2:
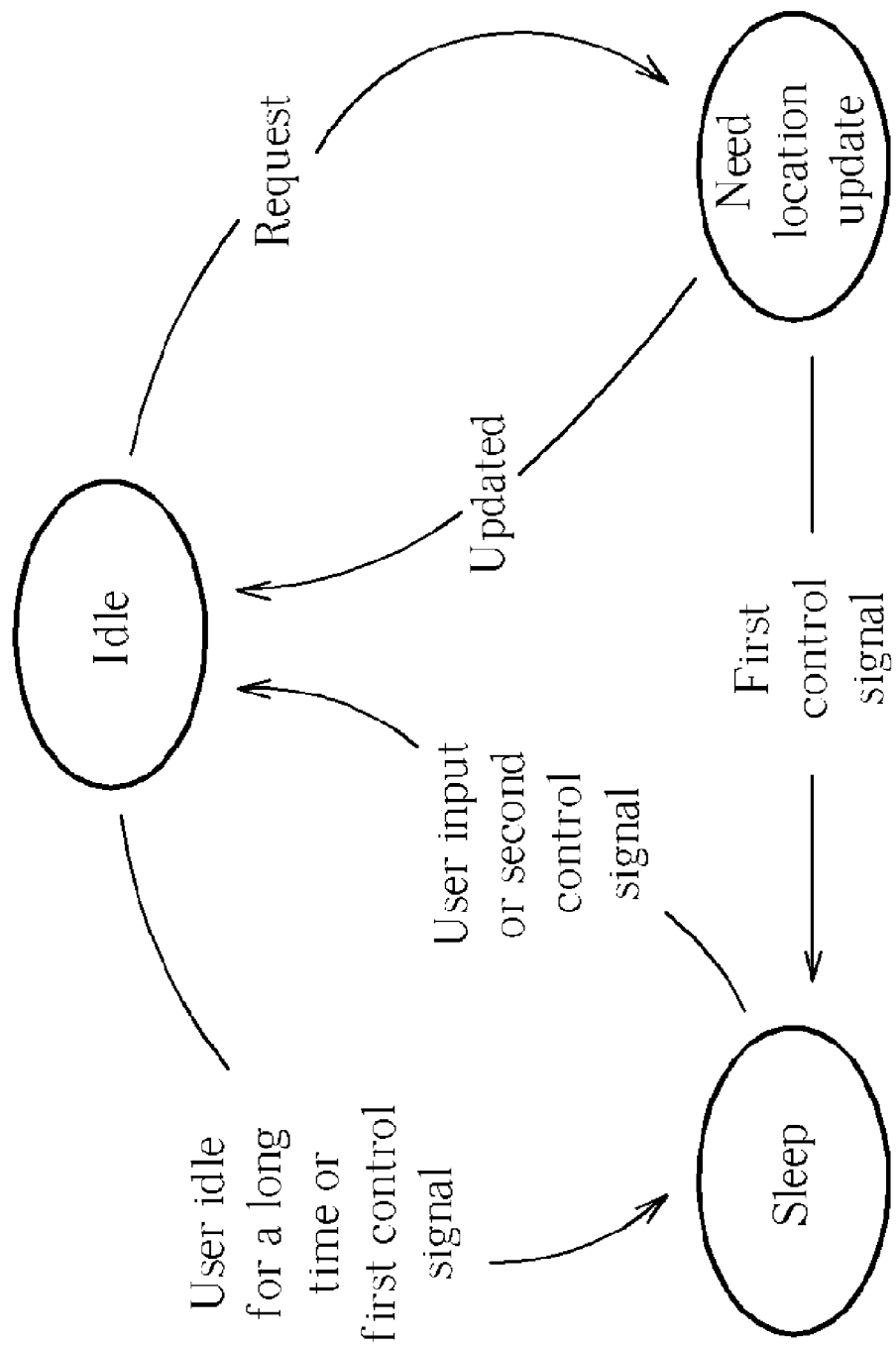
FIG. 2 is a diagram illustrating an exemplary state machine of the processing logic shown in FIG. 1.

Please refer to FIG. 1 in conjunction with FIG. 2. FIG. 2 is a diagram illustrating an exemplary state machine of the processing logic 114 shown in FIG. 1. Suppose that the processing logic 114 initially enters the power saving mode. Therefore, the processing logic 114 stays in the sleep state as the power supply is cut off by the power supply logic 120. When a user input associated with the operation served by the processing logic 114 is triggered, it means that the user wants to use the navigation function provided by the electronic apparatus 100. Therefore, the processing logic 114 has a transition from the current state (i.e., the sleep state) to the next state (i.e., the idle state). Additionally, when the processing logic 114 receives the second control signal SC_2, the processing logic 114 also leaves the sleep state.

After entering the idle state, the processing logic 114, configured for performing the navigation function according to the positioning information, generates a request command for the resultant data DATA containing positioning information on demand or periodically, depending upon design requirements of the navigation device. The receiver logic 104 performs its intended function continuously; however, it outputs the resultant data DATA obtained after processing satellite signals to the processing circuit 114 only when receiving the request command. In this way, the overall power consumption can be reduced as the data transmission of the positioning information is not activated each time the receiver logic 104 successfully completes computing the updated position information according to the satellite signals received from tracked satellites. In short, for those navigation applications that don't have to update the location information frequently, using the aforementioned data transmission scheme of the position information can reduce the overall power consumption greatly.

After generating the request command to request the receiver logic 104 for the desired positioning information, the processing logic 114 has a transition from the current state to the next state for waiting for updated position information transmitted from the receiver logic 104. When a response containing the requested data is received from the receiver logic 104, the processing logic 114 returns to the idle state. However, it is possible that the positioning accuracy is not good enough or the location can't be successfully fixed after the processing logic 114 issues the request command. Under this condition, the processing logic 114 enters the sleep state due to the first control signal SC_1 triggered by the power saving determination logic 106. When the processing circuit 114 is in the idle state and does not receive any user input associated with the navigation operation for a while (i.e., the user is idle for a long time), the processing circuit 114 has a transition from the idle state to the sleep state. In addition, when the processing circuit 114 is in the idle state and receives the first control signal SC_1 generated from the power saving determination logic 106, the processing circuit 114 also enters the sleep state.

In a preferred embodiment of the present invention, the implemented second communication interface 118 supports a power saving mode and enters the power saving mode to further reduce the power consumption of the navigation host (i.e., the second signal processing circuit 112) when the second control signal SC_2 is triggered. Taking a Bluetooth interface serving as the second communication interface 118 for example, the Bluetooth interface enters a low consumption mode, such as a sniff mode or park mode according to the Bluetooth specification, from a normal mode when the processing logic 114 enters the power saving mode. In this way, the Bluetooth interface disposed at the navigation host consumes minimum power for monitoring if there is a second control signal SC_2 waiting to be transmitted from the counterpart Bluetooth interface implemented in the GNSS receiver (i.e., the first signal processing circuit 102). Similar to the processing logic 114, the second communication interface 118 leaves the power saving mode and enters the normal mode after receiving the second control signal SC_2 generated from the power saving determination logic 106.

Figure 3:
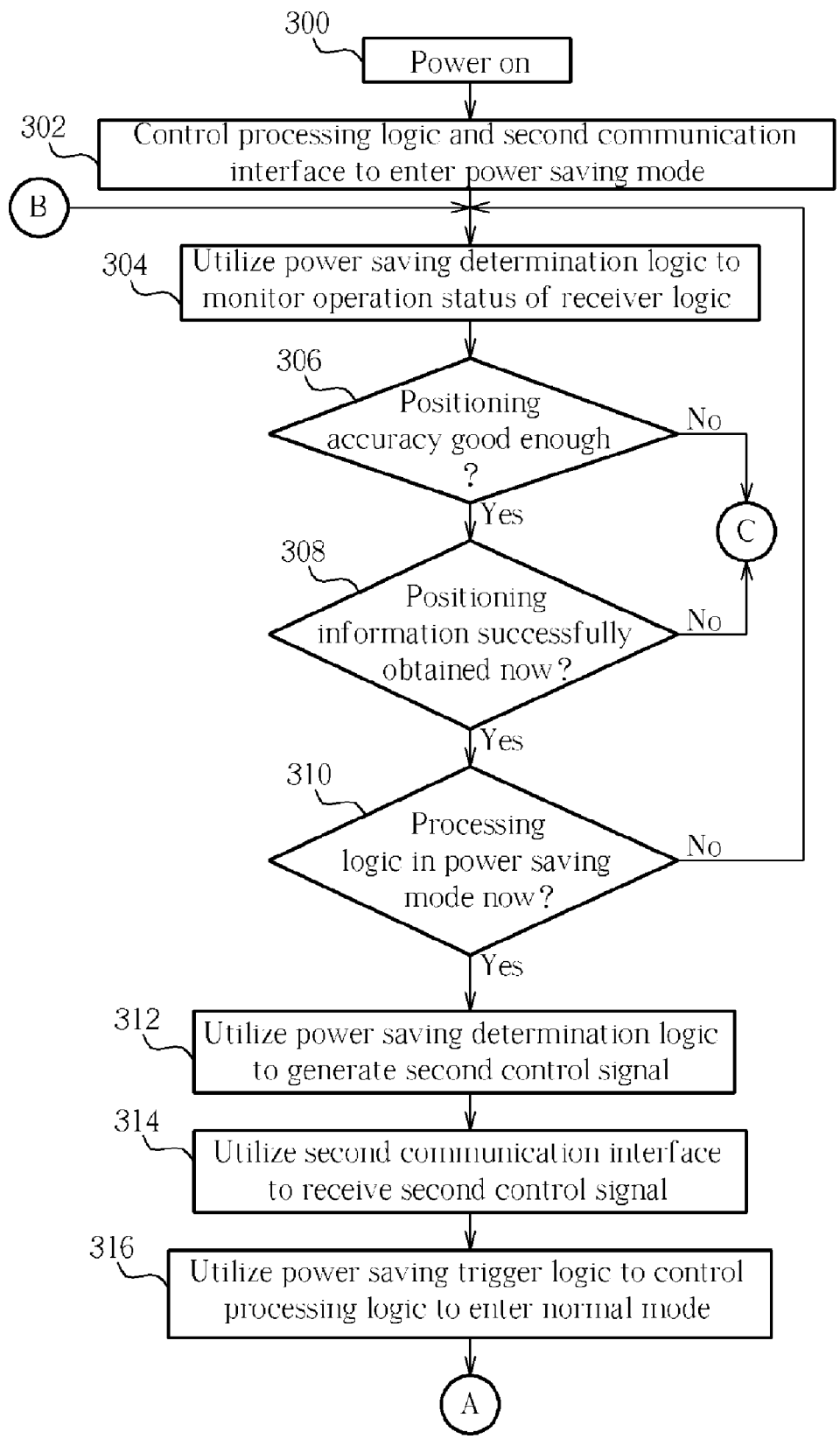
FIG. 3 is a flowchart illustrating a first embodiment of a signal processing method according to the present invention.
Figure 4:
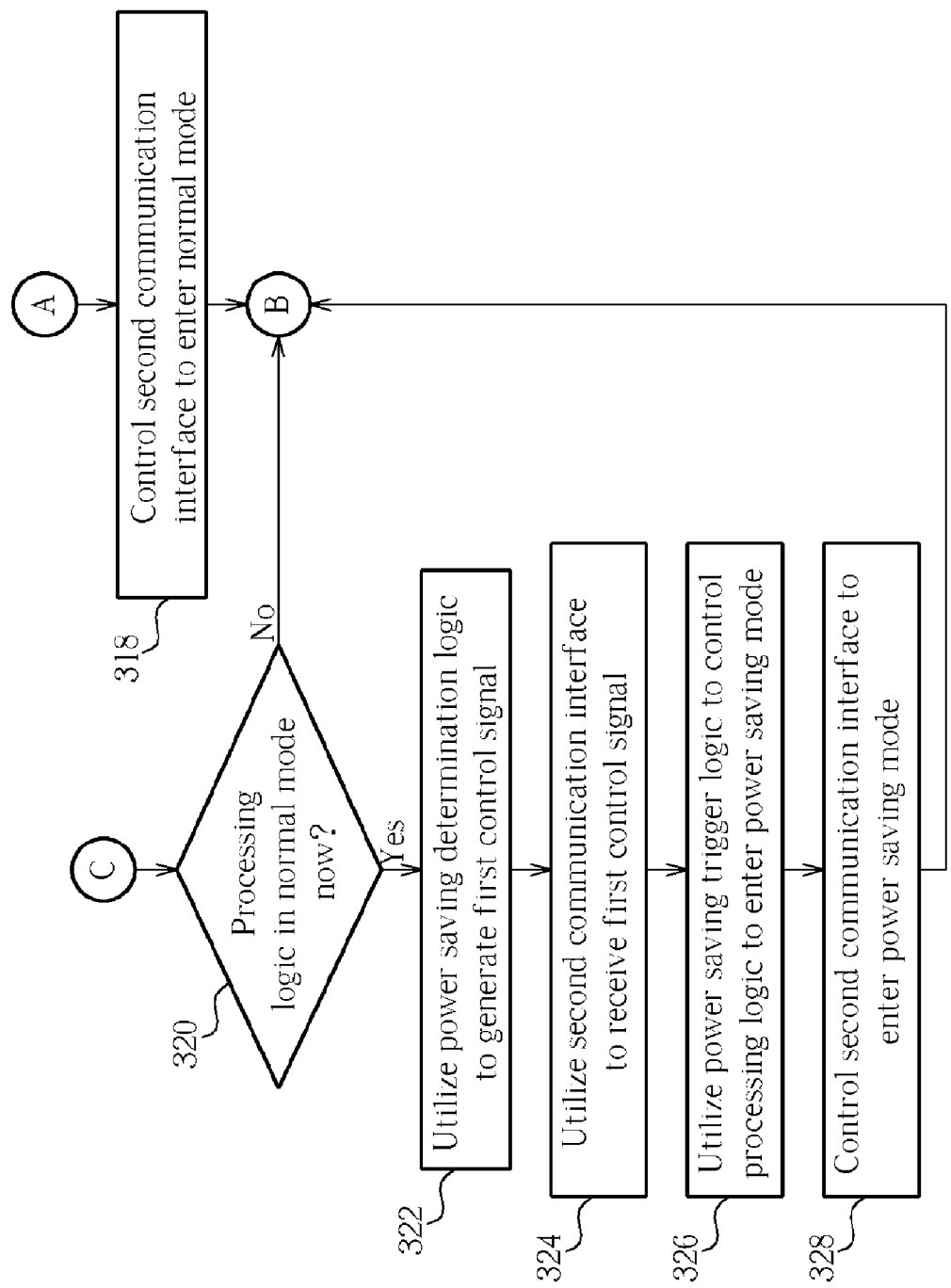
FIG. 4 is a continued flowchart of FIG. 3.

FIG. 3 is a flowchart illustrating a first embodiment of a signal processing method according to the present invention. FIG. 4 is a continued flowchart of FIG. 3. Provided that the result is substantially the same, the steps are not limited to be in the exact order shown in FIG. 3 and FIG. 4. The method is applied to the electronic apparatus 100 shown in FIG. 1 and is summarized as below:

Step 300: Power on the electronic apparatus 100.
Step 302: Control the processing logic 114 and the second communication interface 118 to enter the power saving mode. If the second communication interface 118 is a Bluetooth interface, the power saving mode is a sniff mode or park mode.
Step 304: Utilize the power saving determination logic 106 to monitor an operation status of the receiver logic 104.
Step 306: Is the positioning accuracy good enough? If yes, go to step 308; otherwise, go to step 320.
Step 308: Can the positioning information be successfully obtained now? If yes, go to step 310; otherwise, go to step 320.
Step 310: Does the processing logic 114 stay in the power saving mode now? If yes, go to step 312; otherwise, go to step 304.
Step 312: Utilize the power saving determination logic 106 to generate the second control signal SC_2.
Step 314: Utilize the second communication interface 118 to receive the second control signal SC_2 from the first communication interface 108.
Step 316: Utilize the power saving trigger logic 116 to control the processing logic 114 to enter the normal mode.
Step 318: Control the second communication interface 118 to enter the normal mode. Go to step 304.
Step 320: Does the processing logic 114 stay in the normal mode now? If yes, go to step 322; otherwise, go to step 304.
Step 322: Utilize the power saving determination logic 106 to generate the first control signal SC_1.
Step 324: Utilize the second communication interface 118 to receive the first control signal SC_1 from the first communication interface 108.
Step 326: Utilize the power saving trigger logic 116 to control the processing logic 114 to enter the power saving mode.
Step 328: Control the second communication interface 118 to enter the power saving mode. Go to step 304.

As a skilled person can readily understand operation of each step in FIG. 3 and FIG. 4 after reading above paragraphs, further description is omitted here for brevity.

In the above-mentioned exemplary embodiment, the receiver logic 104 has a baseband processor (general-purpose processor) for computing the positioning information, and the processing logic 114 has a navigation processor (general-purpose processor) for performing the navigation function according to the positioning information carried by the resultant data DATA delivered from the receiver logic 104. However, the power saving mechanism of the present invention is also applicable to a navigation device having a single processor for computing the positioning information and performing the navigation function. Refer to FIG. 1 again. In an alternative design, the receiver logic 104 is modified to include specific-purpose hardware, such as a digital signal processor (DSP), for obtaining demodulation data according to satellite signals generated from tracked satellites of the GNSS system. That is, in this alternative design, the resultant data DATA of the signal processing in the receiver logic 104 include the demodulation data rather than the above-mentioned positioning information. Similarly, the power saving determination logic 106 monitors the operation status of the receiver logic 104 to selectively output the first control signal SC_1 or the second control signal SC_2. After receiving the demodulation data, the general-purpose processor of the processing logic 114 processes the demodulation data to obtain the desired positioning information, and then performs the navigation function according to the positioning information.

In other words, regarding this alternative design having a single general-purpose processor embedded in the processing logic 114 of the navigation host (i.e., the second signal processing circuit 112), no data transmission of the position information is required between the first signal processing circuit 102 and the second signal processing circuit 112. It should be noted that the same objective of reducing power consumption of the processing logic 114 is achieved due to the implementation of the power saving determination logic 106 and the power saving trigger logic 116. For example, the power saving determination logic 106 triggers the first control signal SC_1 when detecting that the receiver logic 104 cannot successfully obtain the demodulation data due to weak satellite signals. Then, the power saving trigger logic 116 controls the processing logic 114 to enter the power saving mode. When detecting that the demodulation data are ready to be delivered, the power saving determination logic 106 triggers the second control signal SC_2. As a result, the processing logic 114 recovers from the power saving mode to the normal mode when triggered by an interrupt generated from the power saving trigger logic 116.

Figure 5:
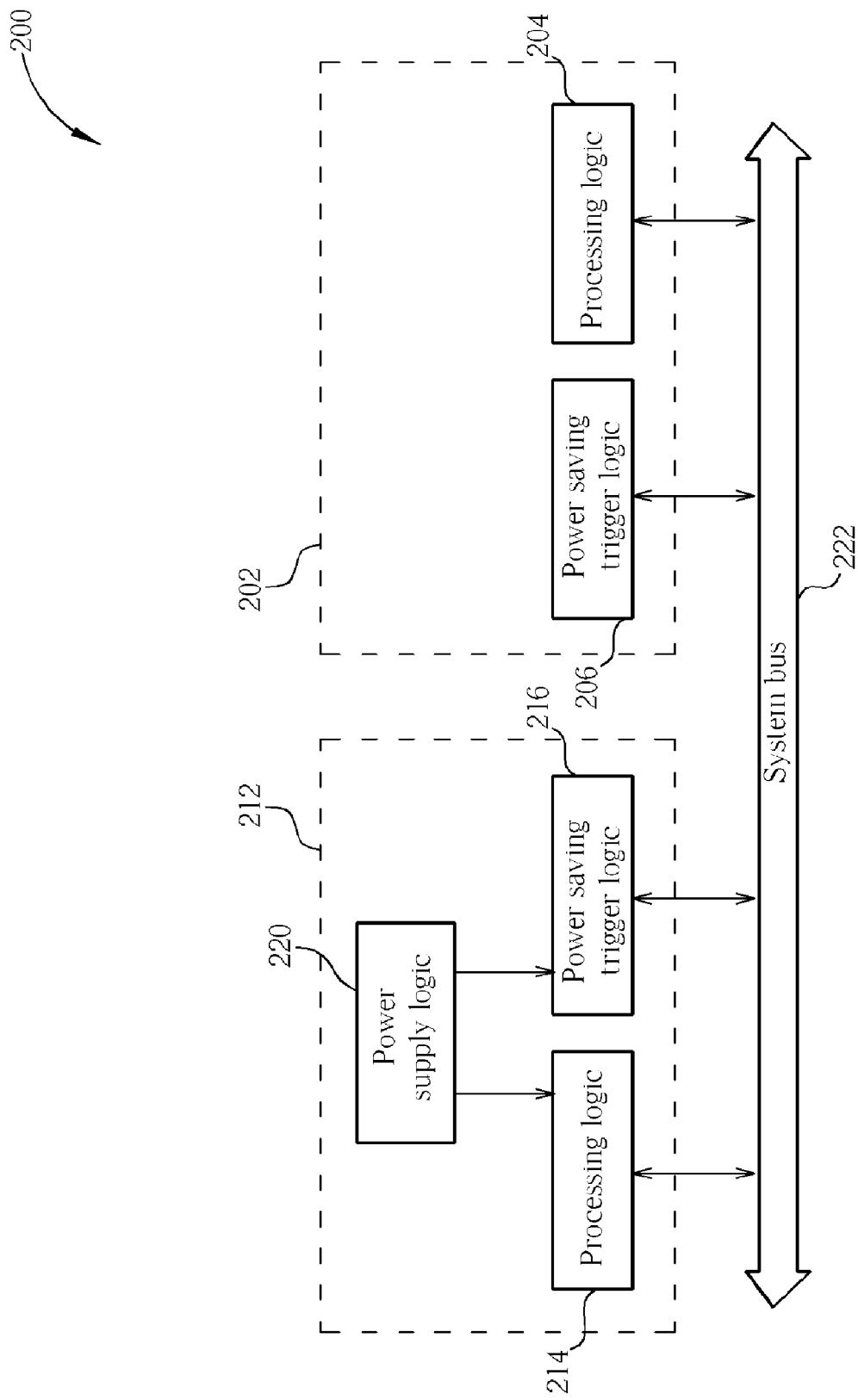
FIG. 5 is a block diagram illustrating an electronic apparatus with power saving functionality according to a second embodiment of the present invention.

Please refer to FIG. 5. FIG. 5 is a block diagram illustrating an electronic apparatus 200 with power saving functionality according to a second embodiment of the present invention. In this embodiment, the electronic apparatus 200 is a portable navigation device having an on-board integration of a global navigation satellite system (GNSS) receiver. However, it should be noted that the power saving mechanism disclosed below can be applied to any application having a GNSS receiver and a navigation system integrated therein. As shown in FIG. 5, the electronic apparatus 200 includes a first signal processing circuit 202, a second signal processing circuit 212, and a system bus 222. The first signal processing circuit 202 includes a receiver logic 204 and a power saving determination logic 206. The second signal processing circuit 212 includes a processing logic 214, a power saving trigger logic 216, and a power supply logic 220. The major difference between the electronic apparatuses 100 and 200 shown in FIGS. 1 and 5 is that the electronic apparatus 200 has no communication interfaces implemented in the first and second processing circuits 102 and 112 due to the on-board integration of the circuit components. Therefore, the receiver logic 204, the power saving determination logic 206, the processing logic 214, and the power saving trigger logic 216 utilize the system bus 222 for data transaction. In the electronic apparatuses 100 and 200 shown in FIGS. 1 and 5, circuit components with the same name have the same operation and functionality. Further description is omitted here for brevity.

Figure 6:
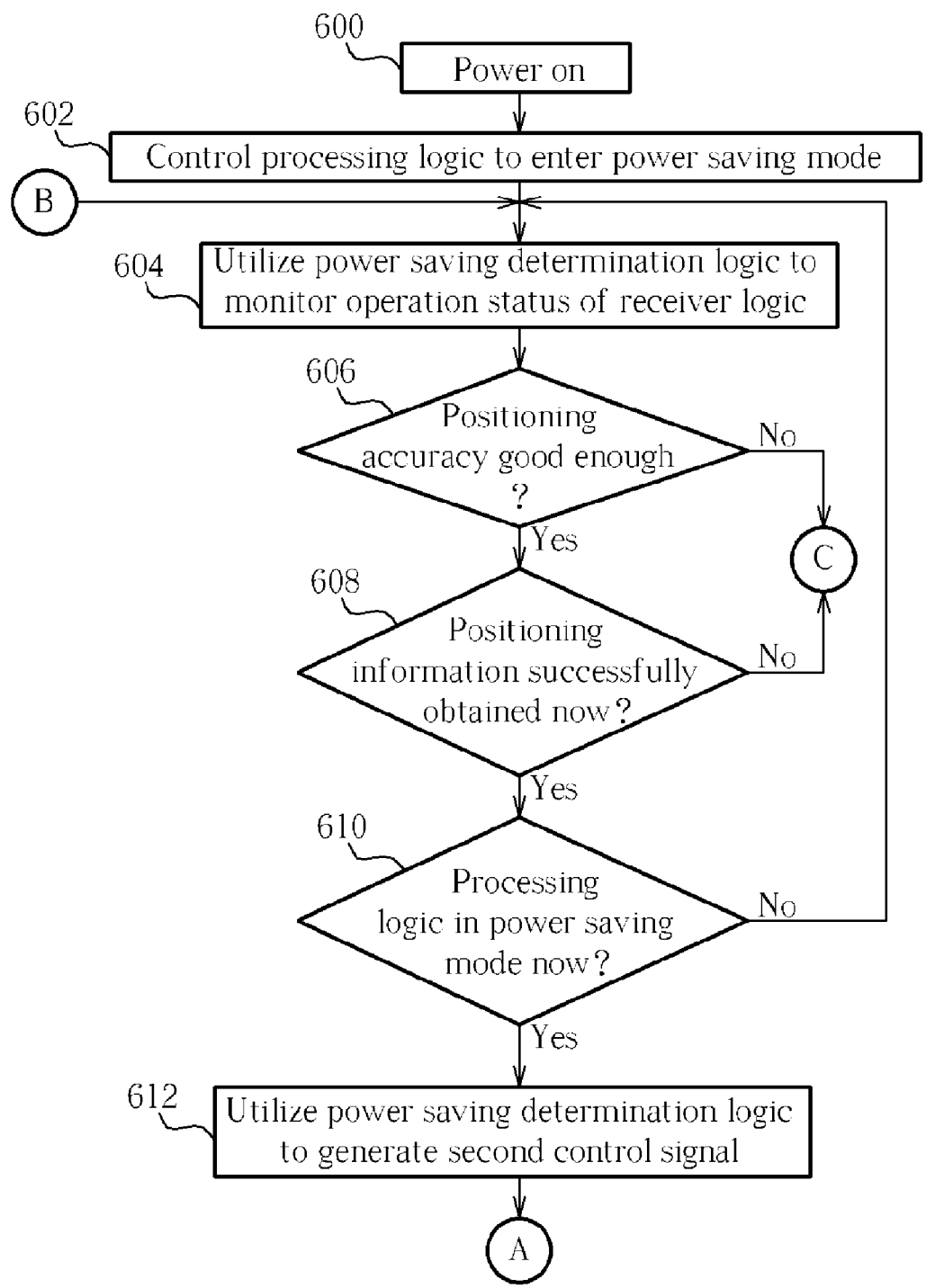
FIG. 6 is a flowchart illustrating a second embodiment of a signal processing method according to the present invention.
Figure 7:
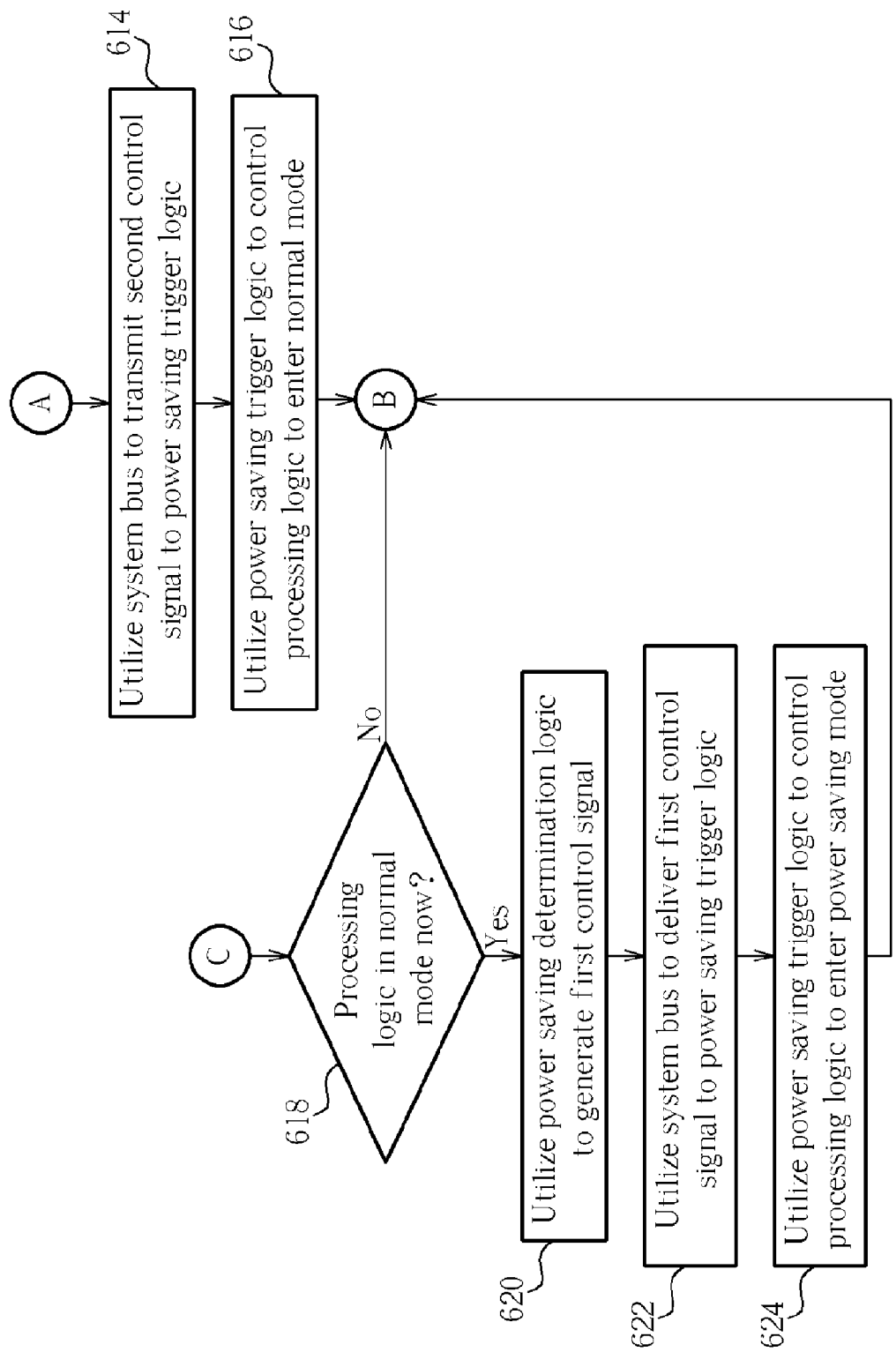
FIG. 7 is a continued flowchart of FIG. 6.

FIG. 6 is a flowchart illustrating a second embodiment of a signal processing method according to the present invention. FIG. 7 is a continued flowchart of FIG. 6. Provided that the result is substantially the same, the steps are not limited to be in the exact order shown in FIG. 6 and FIG. 7. The method is applied to the electronic apparatus 200 shown in FIG. 5 and is summarized as below:

Step 600: Power on the electronic apparatus 200.

Step 602: Control the processing logic 214 to enter the power saving mode.

Step 604: Utilize the power saving determination logic 206 to monitor an operation status of the receiver logic 204.

Step 606: Is the positioning accuracy good enough? If yes, go to step 608; otherwise, go to step 620.

Step 608: Can the positioning information be successfully obtained now? If yes, go to step 610; otherwise, go to step 620. Step 610: Does the processing logic 214 stay in the power saving mode now? If yes, go to step 612; otherwise, go to step 604.

Step 612: Utilize the power saving determination logic 206 to generate the second control signal SC_2.

Step 614: Utilize the system bus 222 to transmit the second control signal SC_2 outputted from the power saving determination logic 206 to the power saving trigger logic 216.

Step 616: Utilize the power saving trigger logic 216 to control the processing logic 114 to enter the normal mode through the system bus 222. Go to step 604.

Step 618: Does the processing logic 214 stay in the normal mode now? If yes, go to step 620; otherwise, go to step 604.

Step 620: Utilize the power saving determination logic 206 to generate the first control signal SC_1.

Step 622: Utilize the system bus 222 to deliver the first control signal SC_1 outputted from the power saving determination logic 206 to the power saving trigger logic 216. Step 624: Utilize the power saving trigger logic 116 to control the processing logic 214 to enter the power saving mode through the system bus 222. Go to step 604.

As a skilled person can readily understand operation of each step in FIG. 6 and FIG. 7 after reading above paragraphs, further description is omitted here for brevity. Additionally, as mentioned above, the power saving mechanism of the present invention is also applicable to a navigation device having a single processor for computing the positioning information and performing the navigation function. Similarly, in an alternative design of the embodiment shown in FIG. 5, the receiver logic 204 is modified to include specific-purpose hardware, such as a digital signal processor (DSP), for obtaining demodulation data according to satellite signals generated from tracked satellites of the GNSS system. Therefore, the power saving determination logic 206 monitors the operation status of the receiver logic 204 to selectively output the first control signal SC_1 or the second control signal SC_2 to the power saving trigger logic 216 via the system bus 222. After receiving the demodulation data, the general-purpose processor of the processing logic 214 processes the demodulation data to obtain the desired positioning information, and then performs the navigation function according to the positioning information. Similarly, the same objective of reducing power consumption of the processing logic 214 is achieved due to the implementation of the power saving determination logic 206 and the power saving trigger logic 216.

Those skilled in the art will readily observe that numerous modifications and alterations of the device and method may be made while retaining the teachings of the invention.

What is claimed is:

1. An electronic apparatus with power saving functionality, comprising:
   a first signal processing circuit, comprising:
   a receiver logic, for processing at least a satellite signal generated from a global navigation satellite system (GNSS) to obtain resultant data; and
   a power saving determination logic, coupled to the receiver logic, for monitoring an operation status of the receiver logic and generating a first control signal according to the operation status, wherein the operation status indicates the positioning accuracy according to the at least one satellite signal; and
a second signal processing circuit, coupled to the first signal processing circuit, comprising:
a processing logic, for receiving the resultant data from the receiver logic and performing navigation functions with the resultant data; and
a power saving trigger logic, coupled to the processing logic, for controlling the processing logic to enter a power saving mode from a normal mode when receiving the first control signal from the power saving determination logic, wherein the processing logic operating in the power saving mode has less power consumption than the processing logic operating in the normal mode.

2. The electronic apparatus of claim 1, wherein the power saving determination logic further monitors the operation status of the receiver logic to generate a second control signal; and the power saving trigger logic controls the processing logic to enter the normal mode from the power saving mode when receiving the second control signal from the power saving determination logic.

3. The electronic apparatus of claim 2, wherein the first signal processing circuit further comprises a first communication interface; the second signal processing circuit further comprises a second communication interface for communicating with the first communication interface; and after receiving the first control signal transmitted from the first communication interface, the second communication interface enters a second operation mode from a first operation mode to monitor if the second control signal is transmitted from the first communication interface, where the second communication interface operating in the second operation mode has less power consumption than the second communication interface operating in the first operation mode.

4. The electronic apparatus of claim 1, wherein the receiver logic transmits the resultant data to the processing logic only when receiving a request command generated from the processing logic.

5. The electronic apparatus of claim 4, wherein the processing logic generates the request command periodically.

6. The electronic apparatus of claim 1, wherein the receiver logic processes a plurality of satellite signals generated from the global navigation satellite system and obtains the resultant data containing positioning information; and the processing logic of the second signal processing circuit performs a navigation function according to the positioning information received from the receiver logic.

7. The electronic apparatus of claim 1, wherein the receiver logic processes a plurality of satellite signals and obtains the resultant data containing demodulation data; and the processing logic of the second signal processing circuit computes positioning information according to the demodulation data received from the receiver logic.

8. The electronic apparatus of claim 7, wherein the processing logic further performs a navigation function according to the positioning information.

9. An electronic apparatus, comprising:
a receiver logic, for processing at least a satellite signal generated from a global navigation satellite system (GNSS) to obtain resultant data; and
a processing logic, for receiving the resultant data from the receiver logic and performing navigation functions with the resultant data, wherein the receiver logic transmits the resultant data to the processing logic only when receiving a request command generated from the processing logic, the processing logic being controlled to enter a power saving mode from a normal mode according to an operation status of the receiver logic, wherein the operation status indicates the positioning accuracy according to the at least one satellite signal.

10. The electronic apparatus of claim 9, wherein the processing logic generates the request command periodically.

11. A signal processing method, comprising:
(a) processing at least a satellite signal generated from a global navigation satellite system (GNSS) to obtain resultant data;
(b) monitoring an operation status of step (a), and generating a first control signal according to the operation status, wherein the operation status indicates the positioning accuracy according to the at least one satellite signal;
(c) utilizing a processing logic to receive the resultant data and performing navigation functions with the resultant data; and
(d) controlling the processing logic to enter a power saving mode from a normal mode when receiving the first control signal;
wherein the processing logic operating in the power saving mode has less power consumption than the processing logic operating in the normal mode.

12. The signal processing method of claim 11, further comprising:
monitoring the operation status of step (a) to generate a second control signal; and
controlling the processing logic to enter the normal mode from the power saving mode when receiving the second control signal.

13. The signal processing method of claim 12, wherein the signal processing logic receives the resultant data outputted from a first communication interface through a second communication interface communicating with the first communication interface; and the signal processing method further comprises:
after the first control signal is transmitted from the first communication interface,
controlling the second communication interface to enter a second operation mode from a first operation mode to monitor if the second control signal is transmitted from the first communication interface, where the second communication interface operating in the second operation mode has less power consumption than the second communication interface operating in the first operation mode.

14. The signal processing method of claim 11, wherein the processing logic receives the resultant data only after generating a request command for the resultant data.

15. The signal processing method of claim 14, wherein the processing logic generates the request command periodically.

16. The signal processing method of claim 11, wherein step (a) comprises processing a plurality of satellite signals to obtain the resultant data containing positioning information; and step (c) comprises utilizing the processing logic to perform a navigation function according to the positioning information.

17. The signal processing method of claim 11, wherein step (a) comprises processing a plurality of satellite signals to obtain the resultant data containing demodulation data; and step (c) comprises utilizing the processing logic to compute positioning information according to the demodulation data.

18. The signal processing method of claim 17, wherein step (c) further comprises utilizing the processing logic to perform a navigation function according to the positioning information.

19. A signal processing method, comprising:

utilizing a receiver logic to process at least a satellite signal generated from a global navigation satellite system (GNSS) to obtain resultant data;

utilizing a processing logic to receive the resultant data and performing navigation functions with the resultant data only after generating a request command for the resultant data; and controlling the processing logic to enter a power saving mode from a normal mode according to an operation status of the receiver logic, wherein the operation status indicates the positioning accuracy according to the at least one satellite signal.

20. The signal processing method of claim 19, wherein the request command is generated periodically.

* * * * *